(12) United States Patent
Bergman

(10) Patent No.: US 8,145,422 B2
(45) Date of Patent: *Mar. 27, 2012

(54) SYSTEM AND METHOD FOR OBTAINING MAP COORDINATES TO FIXED LOCATION

(75) Inventor: Avi Bergman, Carlsbad, CA (US)

(73) Assignees: Avi Bergman, Carlsbad, CA (US); John L. Rogitz, Lakeside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,519

(22) Filed: Jul. 16, 2011

(65) Prior Publication Data

US 2011/0270524 A1   Nov. 3, 2011

Related U.S. Application Data

(63) Continuation of application No. 11/801,654, filed on May 10, 2007, now Pat. No. 7,996,148.

(51) Int. Cl.
*H04M 1/64*       (2006.01)

(52) U.S. Cl. ........................................ 701/408; 342/367
(58) Field of Classification Search .................. 701/408; 342/367, 377, 419, 461, 462; 455/404.2, 455/403, 517, 445, 412.1, 422, 456.1–456.6, 455/414.1–414.4
See application file for complete search history.

(56) References Cited

U.S. PATENT DOCUMENTS 7,506,066 B2 * 3/2009 Nobakht et al. .............. 709/245
7,958,081 B2 * 6/2011 Fitzpatrick et al. .................. 1/1

* cited by examiner

*Primary Examiner* — Dalena Tran
(74) *Attorney, Agent, or Firm* — John L. Rogitz

(57) ABSTRACT

A method for obtaining directions to fixed location such as a restaurant includes using a telephone to call the restaurant, and providing a prompt to the caller during the call to push a button on the telephone to download GPS location of the restaurant. The GPS information is transferred from the telephone to a navigation module in a vehicle which displays a map showing the route to the restaurant.

12 Claims, 2 Drawing Sheets

SYSTEM AND METHOD FOR OBTAINING MAP COORDINATES TO FIXED LOCATION

This is a continuation of and claims priority to U.S. patent application Ser. No. 11/801,654, filed May 10, 2007 now U.S. Pat. No. 7,996,148.

FIELD OF THE INVENTION

The present invention is directed to systems and methods for obtaining map coordinates to fixed locations, such as restaurants.

BACKGROUND OF THE INVENTION

Subscription services have been introduced to provide cellular telephone users with location information to service providers such as restaurants on a subscription basis. An example of such a system is disclosed in Japanese patent publication JP2003075189.

As understood herein, from the service provider's viewpoint it might be less than optimum to leave to the tender mercies of a wireless carrier subscription service the transferring of map information to a patron searching for the location of the service provider. Accordingly, the invention herein is provided.

SUMMARY OF THE INVENTION

A method for obtaining directions to fixed location such as a restaurant includes using a telephone to call the fixed location. The method also includes providing a prompt to the caller during the call to push a button on the telephone to download a navigation code from the fixed location. The code includes GPS location of the fixed location. The method then includes transferring the code from the telephone to a navigation module in a vehicle, and using the navigation module to aurally or visually display directions to the fixed location.

In preferred implementations the telephone communicates with the navigation module such that the code from the fixed location is automatically provided by the telephone to the navigation module. The preferred telephone is wireless telephone and the telephone uses a wired link to communicate with the navigation module. Or, the telephone can be a wireless telephone that uses a wireless link to communicate with the navigation module.

In another aspect, a wireless telephone system includes a wireless telephony transceiver and a telephone processor communicating with the transceiver. A key entry input device communicates with the processor such that a user of the system can call a fixed location and in response to a prompt enter a selection into the processor for transmission of the selection to the fixed location. The transceiver receives back from the fixed location geographic location data of the fixed location in response, with the processor causing directions to the fixed location to be displayed in response to the geographic location data.

In still another aspect, a fixed location includes means for receiving telephone calls, and means for, in response to the telephone calls, providing automatic prompts including a prompt to select to have a GPS navigation code representing latitude and longitude of the fixed location downloaded over a telephony network to a calling telephone.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
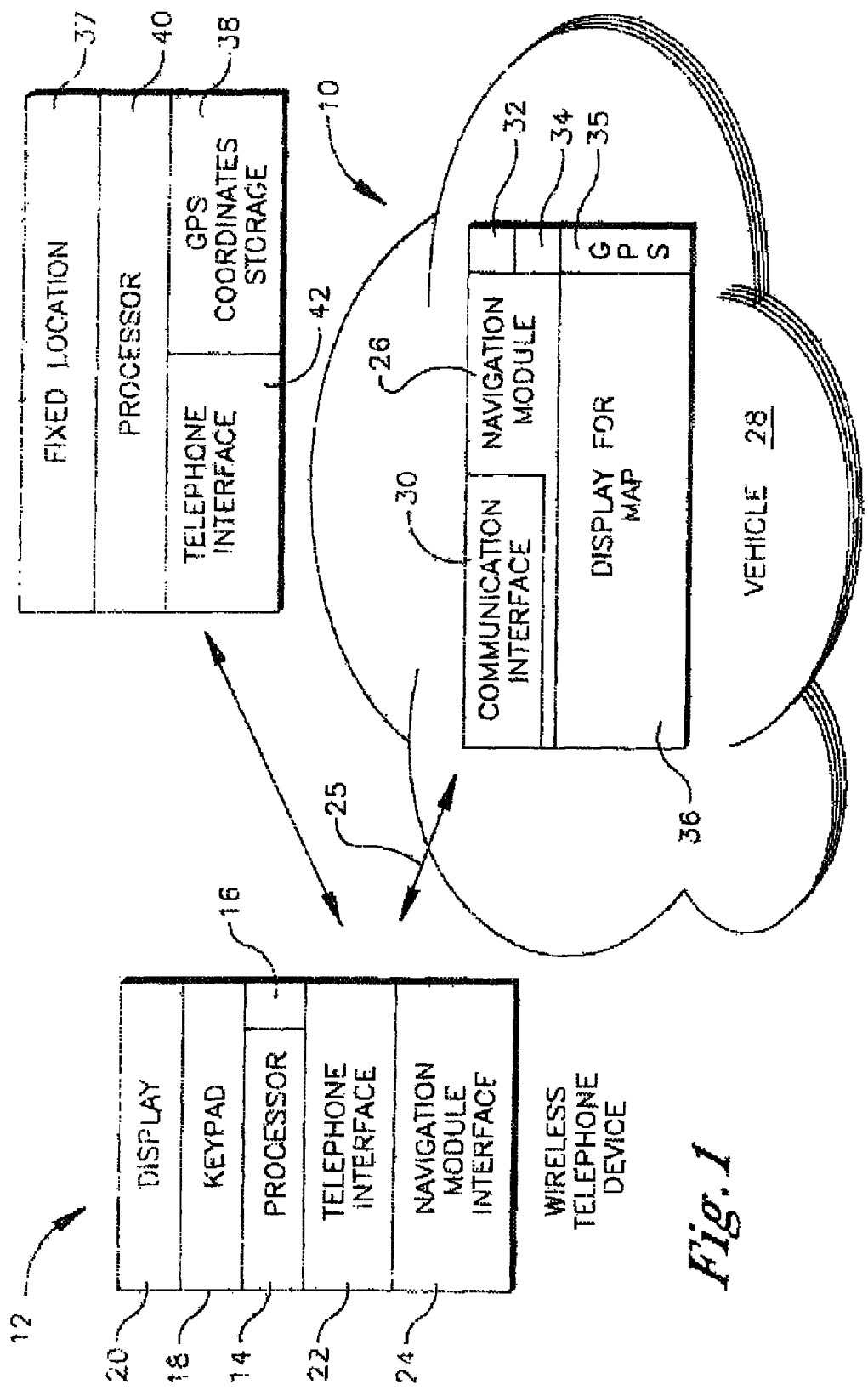
FIG. 1 is a block diagram of a preferred non-limiting system in accordance with present principles.

Referring initially to FIG. 1, a system is shown, generally designated 10, which includes wireless modules such as a portable wireless telephone 12 having a telephone processor 14 accessing a computer readable medium 16 that stores logic for executing various methods discussed herein. The telephone processor 14 may receive input from a keypad 18 and may output text, numbers, and video information on a telephone display 20. The wireless telephone 12 may send and receive information using a wireless telephony interface 22 that may employ, without limitation, code division multiple access (CDMA), global system for mobile communication (GSM), time division multiple access (TDMA), wideband CDMA (W-CDMA), space division multiple access (SDMA), frequency division multiple access (FDMA), and orthogonal frequency division multiplexing (OFDM) principles known in the art to effect wireless communication.

Additionally, in some implementations the wireless telephone 12 may include a navigation module interface 24 for communicating, via a wired or wireless link 25, with a navigation module 26 mounted in a vehicle 28. Specifically, the telephone navigation module interface 24 communicates over the link 25 with a complementarily-configured navigation module communication interface 30. The navigation module 26 may contain a module processor 32 accessing a computer readable medium 34 that stores computer code embodying logic discussed herein to present map information on a navigation module display 36. The various computer readable media disclosed herein may be solid state media, disk-based media, or other appropriate media, fixed or removable in their respective components.

The link 25 may be a wired link such as but not limited to a universal serial bus (USB) link or an Ethernet link. Or, the link 25 may be a wireless link such as a Bluetooth link, a near field communication (NFC) link, a personal area network (PAN) link, or even a telephony link, in which latter case the navigation module interface 24 of the wireless telephone 12 may be omitted and the wireless telephony interface 22 used in its place. In any case, the telephone and module communication interfaces 24, 30 are structured according to the type of link being used. The navigation module 26 may include a GPS receiver 35 for receiving GPS location information pertaining to the location of the vehicle. The telephone 12 likewise may include a GPS receiver if desired.

In accordance with disclosure below, the telephone 12 can communicate via a wireless telephony network with one or more fixed locations 37 such as, e.g., restaurants or other public service providers or indeed with private dwellings implementing the invention herein. The fixed location 37 is geographically fixed, and its geographic location may be stored on a computer readable medium 38 in the form of, e.g., global positioning satellite (GPS) location, such that a fixed location processor 40 can communicate the location information via a telephony interface 42 that is associated with the fixed location to the telephone 12. The telephony interface 42 may be part of a telephone answering system that can include automatic menu prompts in accordance with disclosure below.

Figure 2:
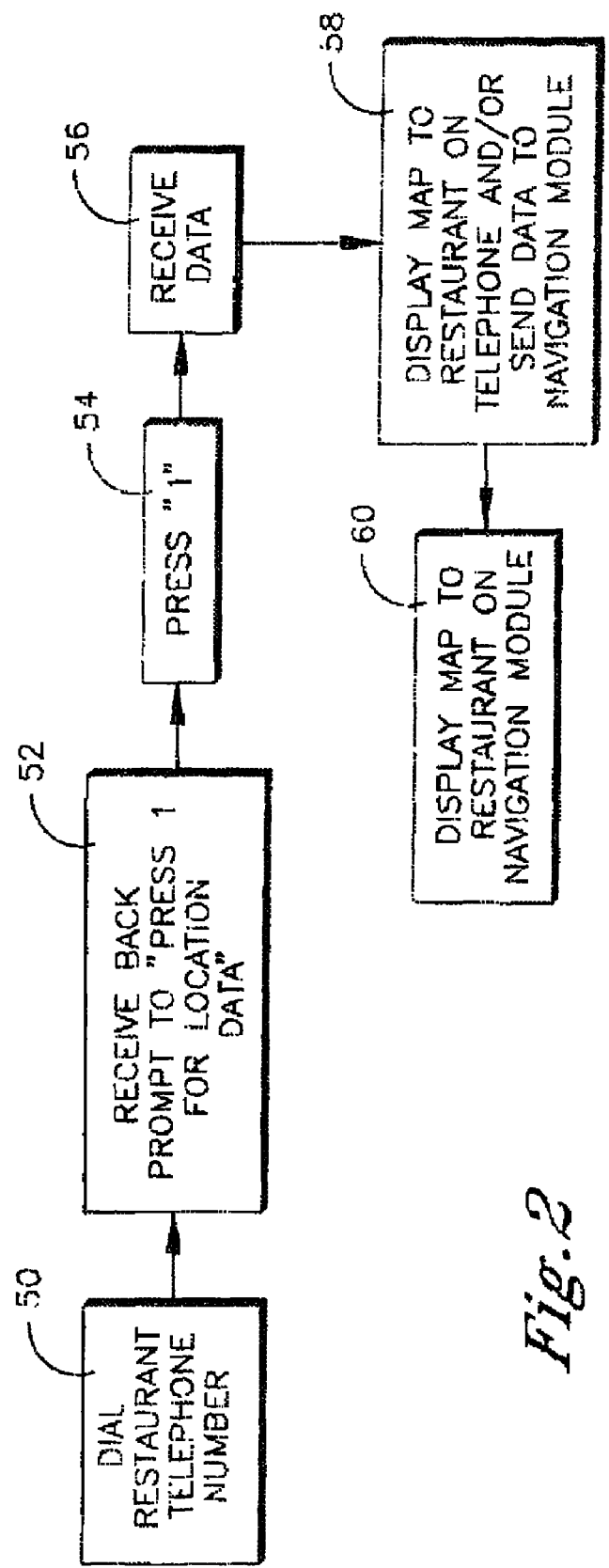
FIG. 2 is a flow chart of preferred non-limiting logic in accordance with present principles.

Turning now to FIG. 2, commencing at block 50 a person who typically would be an occupant of the vehicle 28 uses the telephone 12 to call the telephone number of the fixed location 37, which for illustration will be referred to as a "restaurant" in the following discussion. When the connection is made, the restaurant processor 40 causes an automatic menu prompt routine to be transmitted to the telephone 12, with the menu prompt routine including a prompt for obtaining geographic location data. For example, the restaurant can prompt the telephone user to "press one for GPS location data."

At block 54, the user can press "1" on the telephone keypad 18, which is transmitted back to the restaurant to cause the restaurant processor 40 to automatically download the GPS location of the restaurant, usually in the form of a navigation code representing latitude and longitude, to the telephone 12. The data is received by the telephone 12 at block 56, and in some implementations at block 58 the logic of the telephone 12 can access the telephone's GPS location and map data that may be stored on, e.g., the medium 16 (in essence, a navigation Module. within the telephone 12) to cause a map or other directions such as text directions or aural instructions (e.g., "turn right at the next light") to be displayed. Visual directions may be displayed on the telephone display 20 showing the route from the current location of the telephone 12 to the restaurant. According to present principles, the map is derived using, as starting location, the telephone's GPS location and as end destination, the GPS information received from the restaurant.

More preferably, in addition to or in lieu of presenting the map on the telephone, at block 58 the restaurant location data is automatically sent from the telephone 12 to the vehicle navigation module 28 over the link 25 at block 58. Consequently, at block 60 the logic of the navigation module 26 can access the vehicle's GPS location from the GPS receiver 35 and map data that may be stored on, e.g., the medium 34 to cause a map or other directions to be displayed on the navigation module display 36 of the route from the current location of the vehicle 28 to the restaurant. In addition or alternatively the module 28 may display aural directions. According to present principles, the map is derived using, as starting location, the vehicle's GPS location and as end destination, the GPS information received from the restaurant.

While the particular SYSTEM AND METHOD FOR OBTAINING MAP COORDINATES TO FIXED LOCATION is herein shown and described in detail, it is to be understood that the subject matter which is encompassed by the present invention is limited only by the claims.

I claim:

1. A method for obtaining directions to a location, comprising:
    using a telephone to call the location;
    providing a prompt to the caller during the call to push a button identified by the prompt on the telephone and in response to a caller pushing the button identified by the prompt, downloading a navigation code from the location, the code including geographic location of the location;
    transferring the code downloaded in response to the prompt from the telephone to a navigation module in a vehicle, wherein the navigation module is used to display directions to the fixed location.

2. The method of claim 1, wherein the telephone communicates with the navigation module such that the code from the location is automatically provided by the telephone to the navigation module.

3. The method of claim 2, wherein the telephone is a wireless telephone and the telephone uses a wired link to communicate with the navigation module.

4. The method of claim 2, wherein the telephone is a wireless telephone and the telephone uses a wireless link to communicate with the navigation module.

5. The method of claim 1, wherein the location is a restaurant.

6. The method of claim 1, wherein the navigation module is mounted in a vehicle.

7. The method of claim 1, wherein the navigation module is housed in the telephone.

8. A wireless telephone system comprising:
    at least one wireless telephony transceiver;
    at least one telephone processor communicating with the transceiver;
    at least one key entry input device communicating with the processor, wherein a user of the system can call a location and in response to a prompt enter a selection from the key entry input device into the processor for transmission of the selection from the key entry input device to the location, the selection from the key entry input device being identified by the prompt, the transceiver receiving back from the location in response to the prompt geographic position satellite (GPS) location data of the location in response, the processor causing directions to the location to be displayed in response to the GPS location data downloaded in response to the prompt.

9. The system of claim 8, wherein the system includes a portable wireless telephone containing the transceiver, processor, and input device.

10. The system of claim 9, wherein the portable wireless telephone includes a display on which the processor causes to be displayed the directions to the location.

11. The system of claim 9, wherein the portable wireless telephone includes a communication interface communicating with a navigation module in a vehicle, the navigation module having a display on which is caused to be displayed the directions to the location.

12. A fixed location comprising:
    means for receiving telephone calls; and
    means for, in response to the telephone calls, providing prompts including at least one prompt to select to have a GPS navigation code representing latitude and longitude of the fixed location downloaded over a telephony network to a calling telephone in response to at least one prompt being acted upon by a recipient of the prompt.

* * * * *